Figure 1:
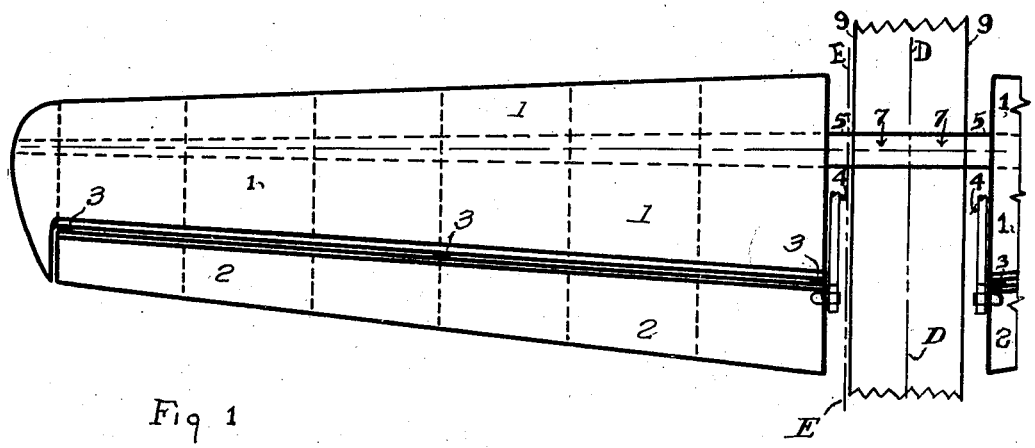

June 27, 1933.     B. S. WELSHER     1,915,809

AEROPLANE

Filed June 1, 1931

Inventor:

Burdette Star Welsher

Patented June 27, 1933

1,915,809

UNITED STATES PATENT OFFICE

BURDETTE STAR WELSHER, OF SAN LUIS OBISPO, CALIFORNIA

AEROPLANE

Application filed June 1, 1931. Serial No. 541,305.

In the drawing:

Figure 1 is a drawing to show the method used to connect the front part of the wing 1 and the flap 2. Hinges 3 allow 1 and 2 to move dependent of one another. Numbers 9 are the vertical sides of a fuselage. DD and EE are section lines for Figure 2 and Figure 3. No attempt has been made, in this figure, to show the mechanism at the end of the wing as shown in Figure 2.

Figure 2:
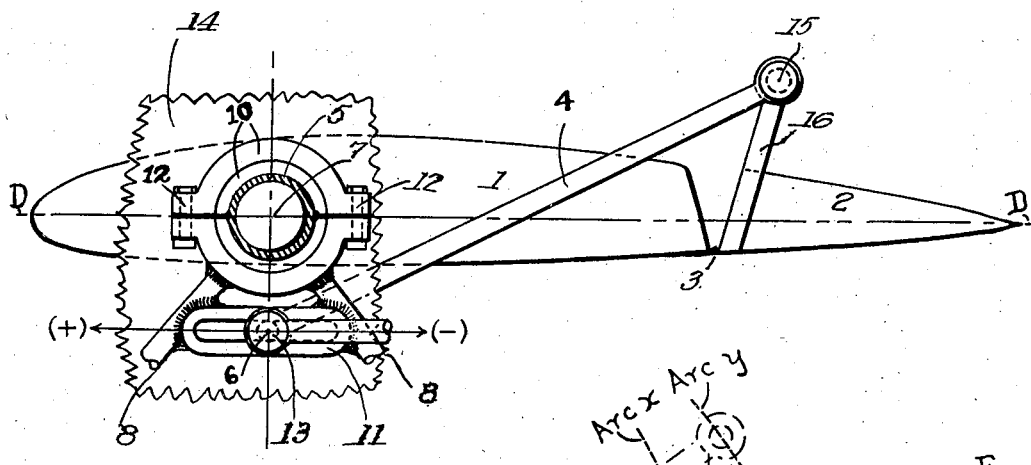

Figure 2 is a sectional view taken on line D—D of Fig. 1, drawn to a larger scale, showing the mechanism at the end of the wing. In addition to being a section line DD may also designate the chord line of the wing. Number 14 is a section of the vertical fuselage wall shown as 9 in Figure 1. Number 10 is a bearing cap and seat for the wing supporting shaft 5 to rotate in. Number 7 is the axis of rotation and is located at the center of bearing 5. Numbers 12 are the bearing cap bolts. Numbers 8 are fuselage section braces. Number 6 is the ratio point located as the center point of bearing pin 13 that slides in a horizontal direction (+) or (—) in guide number 11. Number 4 is a solid rod pivotaly attached at 13 and 15. Number 16 is a solid rod attached solidly to 2 and pivotally at 15. The front part of the wing 1 by means of shaft 5 is journaled in bearing 10 and the rear flap 2 is pivotally attached to 1 by 3. This figure shows how, when the ratio point 6 moves, the flap 2 also moves.

Figure 3:
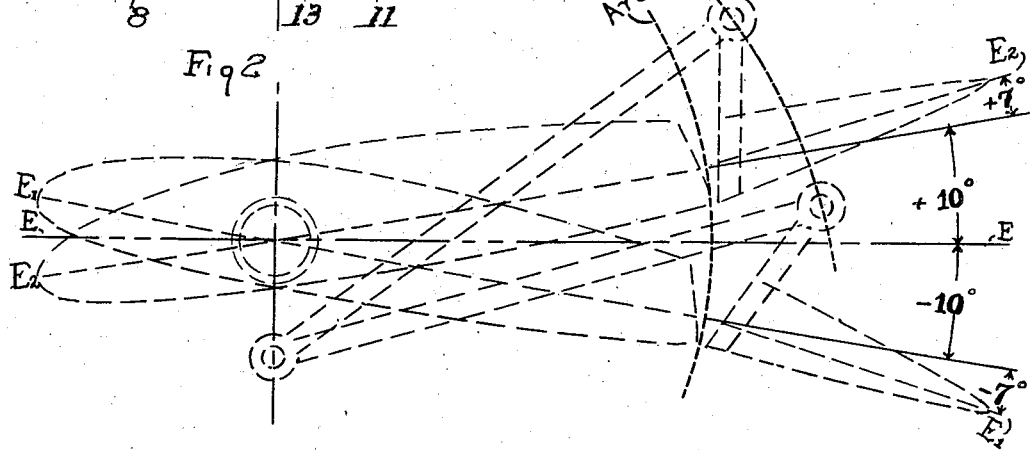

Figure 3 is a motion diagram of Figure 2, being a section on Figure 1 at EE. EE may be considered as the chord line of Figure 2 or DD. E1E1 and E2E2 are reproductions of EE when the wing is in a +10 degree attack condition and a —10 degree angle of attack condition. Arc $x$ is the line of motion of 3 drawn from the rotation point 7. Arc $v$ is the line of motion of 15 drawn from the ratio point 6. In Figures 1, 2, and 3 the numbers designate the same parts. Figure 3 shows how the flap 2 rotates on bearings 3 as the front of the wing 1 rotates on the bearing 5 if the ratio point 6 is held stationary.

The front parts of the wing 1 extending on each side of the fuselage will each be at the same angle of attack at all times. The flaps of the wing 2 will be independent of one another and will not be attached together through the controls.

In Figure 2 the center of pressure is reversed when the wing attempts to move as shown in Figure 3. This is because of the flap 2. I will use the action of the aileron on the present day aeroplane to illustrate this. While flying in a ship of the present day type if one wishes to bank he will cause the aileron on one side of the ship to rise and the other on the other side to lower. On the side that the aileron rises a lesser lift will be apparent, and on the side the aileron lowers a greater lift will be apparent. These unequal forces form a couple and the ship will be forced on its side. If the action of one of the ailerons on one side of this ship was reversed temporarily and both the ailerons went up at the same time and down at the same time as the flaps 2 in this improvement do when 6 of Figure 2 is moved it can be seen how the aileron's previous coupling forces can be transferred into forces tending to change the center of pressure of the whole ship for the forces are changed to straight up and down at about 70% of the wing chord. A study of the center of pressure movement on certain types of airfoil will reveal that it varies over a space of about 15% of the wing chord distance. If the bearing 5 in Figure 2 is placed in the center of this movement a very small pressure at 70% of the wing chord from the leading edge will easily counteract any rotational force caused by this original center of pressure. The cause of the change of the center of pressure when arrangements shown in Figure 2 are met with is due entirely to the movement of the flap 2, and not on the change of angle of attack of the wing. The movement of the flap 2 overcomes the original center of pressure of the wing and creates another that acts in the opposite direction when correctly guided.

The wing has a regular wing curve, namely the N. A. C. A. M-12. Other wing curves may also be used. The planform wing is divided into two parts, 1 and 2, and are fastened together with hinges, numbers 3. The wing bearings 5 are so placed on the wing chord DD that the wing will be balanced at an angle of attack of +1.5 degrees with the relative wind, the center of pressure of the wing being directly over the point of rotation of the wing 7. This position is about 25% of the wing chord from the leading edge. The flap 2 in this position will be unaltered as respects the original wing in its original solid planform as shown in Figure 2.

The means of control over the wing's angle of attack is the movement of the ratio point 6 in a horizontal direction of + or − as shown in Figure 2. Moving 6 in a horizontal direction changes the angular movement of the flap 2 with respect to that of the wing 1. After the desirable angle of attack has been found, in flight, and the ratio point 6 is stationary, the action that takes place on the wing 1 and the flap 2 is dependent on the air forces and their directions. This secondary automatic action, caused by the change of direction of the air currents, goes on no matter at what angle of attack the wing is to the relative wind. The explanation of this action will be explained with the ratio point 6 stationary, from Figure 3, later.

In Figure 2 the movements of the parts are as follows:

When the ratio point 6 moves forward (+), point 15 moves forward, causing the flap 2 to move up. In flight this would cause the center of pressure to move forward from over the point of rotation 7 and tend to turn the wing 1 in a clockwise direction on bearings 5 until it had passed through a certain number of degrees where the center of pressure would again be over 7. When the ratio point 6 is moved backward (−), point 15 moves a like number of degrees in the same direction, causing the flap 2 to move down a certain number of degrees. In flight this would cause the center of pressure to move backward from over 7 and tend to turn the wing 1 in a counter clockwise direction on 5 until it had passed through a certain number of degrees where the wing would again be in equilibrium.

The wing will remain in the position shown in Figure 2 at all times when flying in air that has no vertical air currents if point 6 is held in the position as shown. There will never be any force on the wing as I am going to use, but for explanation and descriptive matter suppose while in flight one were to reach out of the cabin window and push down on the flap 2. Immediately the center of pressure of the wing would move backward from point 5 and if the wing were released from the force just put on it it would return to its original position of +1.5 degrees angle of attack with the relative wind. In a like manner if one were to lift up on the trailing edge of the flap 2 the center of pressure would go forward and if the wing were again released it would go back to the former +1.5 degree angle of attack position.

From Figure 3 it can be seen how the flap 2 changes its angle of attack dependent on the wing 1 as the wing's angle of attack changes by drawing arcs $x$ and $y$ from their respective rotation points, 7 and 6. The arc $x$ is constant and cannot be changed. The arc $y$ may be changed by moving point 6 in a vertical direction. This movement vertically need not be made after the ideal distance from the rotation point 7 to the ratio point 6 has been found. There is a certain positional distance from the center of rotation 7 of the wing 1 to the ratio point 6 that will give the ideal angular rotation for the flap 2 to have in relation to the angular rotation of the wing 1. In the particular case of the wing and flap in Figure 2, the length of the rod 16 or distance 3—15 to the distance 7—6 is in a ratio of 7:10. With this ideal leverage the wing can change its angle with the ground from 0 degrees to 14 degrees and the lift will remain the same providing the angular change is caused by the relative wind and the ratio point is held. Suppose while flying along one were to hit a vertical air current going upward and the flap 2 had a leverage of less than .7, the bump would be more than counteracted and the ship would drop. If the leverage of the flap were more than .7, the wing would not counteract the bump and the ship would rise with the bump. The wings would act inversly to a vertical air current going in the opposite direction. In a previous paragraph I illustrated how the flap 2 when moved up or down would rotate the wing 1 by changing its center of pressure. Now if the flap is held stationary by holding 6 and only allowed to move as the front part of the wing 1 rotates, just as the center of pressure changed when 2 was moved so when the directional change of relative wind causes the flaps to move the wing 1 will move also. Therefore whenever there is a change of relative wind the wing changes its position and form with the lift remaining constant. In Figure 3 E1E1 will be the first position of the wing with the relative wind parallel to E1E1. If the relative wind changes to E2E2 the wing will change to E2E2. After the wing in Figure 2 has found itself with the relative wind unless the relative wind changes the wing will not change position because the center of pressure holds it in position. The wing changes form and position but does not change its lift forces when the center of pressure causes the wing to rotate at 5.

I claim:

1. The combination with an aeroplane fuselage, of right and left hand wings, each wing consisting of a forward part forming more than half of its surface area and a trailing edge flap hingedly mounted thereon, bearings in said fuselage, a shaft rigidly interconnecting said forward parts near the leading edge thereof and journaled in said bearings, a pair of levers each having one end connected to the upper forward portion of a flap, the other end slidably connected to said fuselage forward of and below said flap for horizontal movement and means for moving each lever whereby displacement of said wing about its axis of rotation changes the angle of the flap to the wing to create a force tending to restore the wing to its original position.

2. In an aeroplane, an entire lifting surface comprising a forward part consisting of more than half of the entire surface area rigidly mounted on a shaft adapted to be journaled in the body of the aeroplane and to extend equally in distance and area on each side away from the longitudinal plane of symmetry of the body, and a flap consisting of the remainder of the area hingedly connected to the first part, means pivotally connected to the upper forward portion of the flap adapted to be extended downwardly and forwardly for sliding attachment below said flap to said fuselage.

BURDETTE STAR WELSHER.